(12) United States Patent
Arizmendi et al.

(10) Patent No.: US 9,015,048 B2
(45) Date of Patent: Apr. 21, 2015

(54) INCREMENTAL SPEECH RECOGNITION FOR DIALOG SYSTEMS

(71) Applicants: AT&T Intellectual Property I, L.P., Atlanta, GA (US); Oregon Health & Science University—Technology Transfer & Business Development, Portland, OR (US)

(72) Inventors: Iker Arizmendi, North Bergen, NJ (US); Jason Williams, Seattle, WA (US); Ethan Selfridge, Portland, OR (US)

(73) Assignees: AT&T Intellectual Property I, L.P., Atlanta, GA (US); Oregon Health and Science University, Portland, OR (US)

( * ) Notice: Subject to any disclaimer, the term of this patent is extended or adjusted under 35 U.S.C. 154(b) by 183 days.

(21) Appl. No.: 13/691,005

(22) Filed: Nov. 30, 2012

(65) Prior Publication Data

US 2014/0156268 A1 Jun. 5, 2014

(51) Int. Cl.
*G10L 15/22* (2006.01)
*G10L 15/18* (2013.01)

(52) U.S. Cl.
CPC .................. *G10L 15/1822* (2013.01)

(58) Field of Classification Search
USPC .............................. 704/231, 270.1
See application file for complete search history.

(56) References Cited

U.S. PATENT DOCUMENTS 7,711,568 B2* 5/2010 Arizmendi et al. ........ 704/270.1
8,099,284 B2* 1/2012 Arizmendi et al. ........ 704/270.1
8,687,792 B2* 4/2014 Yacoub et al. ........... 379/265.06

OTHER PUBLICATIONS

Baumann et al., "Assessing and improving the performance of speech recognition for incremental systems," In *Proc. NACCL: HLT*, Association for Computational Linguistics, 2009, pp. 380-388.
Buβ et al., "DIUM—An Incremental Dialogue Manager That Can Produce Self-Corrections," *Proceeedings of Semdial*, 2011.
DeVault et al., "Can I Finish? Learning when to respond to incremental interpretation results in interactive dialogue," In *Proceedings of the SIGDIAL 2009 Conference*, Association for Computational Linguistics, London, UK, Sep. 2009, pp. 11-20.
Goffin et al., "The AT&T Watson speech recognizer," In *Proceedings of ICASSP*, 2005, pp. 1033-1036.
Lu et al., "Decision of response timing for incremental speech recognition with reinforcement learning," In *IEEE Workshop on Automatic Speech Recognition and Understanding (ASRU)* 2011, p. 467-472.

(Continued)

*Primary Examiner* — Susan McFadden

(57) ABSTRACT

A system and method for integrating incremental speech recognition in dialog systems. An example system configured to practice the method receives incremental speech recognition results of user speech as part of a dialog with a user, and copies a dialog manager operating on the user speech to generate temporary instances of the dialog manager. Then the system evaluates actions the temporary instances of the dialog manager would take based on the incremental speech recognition results, and identifies an action that would advance the dialog and a corresponding temporary instance of the dialog manager. The system can then execute the action in the dialog and optionally replace the dialog manager with the corresponding temporary instance of the dialog manager. The action can include making a turn-taking decision in the dialog, such as whether, what, and when to speak or whether to be silent.

20 Claims, 4 Drawing Sheets

(56) References Cited

OTHER PUBLICATIONS

Schlangen et al., "A general, abstract model of incremental dialogue processing," In *Proceedings of the 12th Conference of the European Chapter of the Association for Computational Linguistics*, 2009, pp. 710-718.

Selfridge et al., "Stability and accuracy in incremental speech recognition," *Proceedings of the SIGdial*, 2011.

Skantze et al., "Incremental dialogue processing in a micro-domain," In *Proceedings of the 12th Conference of the European Chapter of the Association for Computational Linguistics*, 2009, pp. 745-753.

Thomson et al., "Bayesian update of dialogue state: A pomdp framework for spoken dialogue systems," *Computer Speech & Language*, 2010, 24(4):562-588.

Williams et al., "Estimating probability of correctness for asr n-best lists," In *Proceedings SIGDIAL*, London, UK.

Williams et al., "Partially observable markov decision processes for spoken dialog systems," *Computer Speech & Language*, 2007, 21(2):393-422.

J.D. Williams. "An empirical evaluation of a statistical dialog system in public use." In *Proceedings of the SIGDIAL 2011 Conference*, Association for Computational Linguistics, pp. 130-141.

Young et al., "The hidden information state model: A practical framework for pomdp-based spoken dialogue management," *Computer Speech & Language*, 2010, 24(2): 150-174.

\* cited by examiner

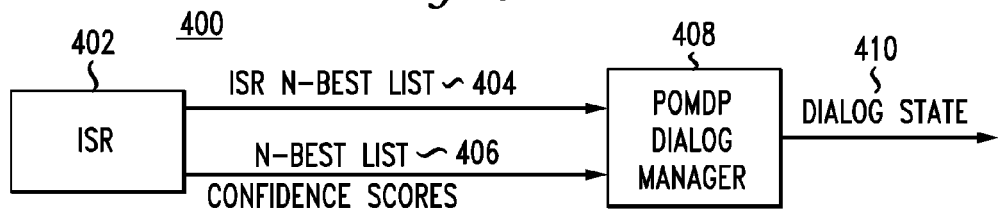
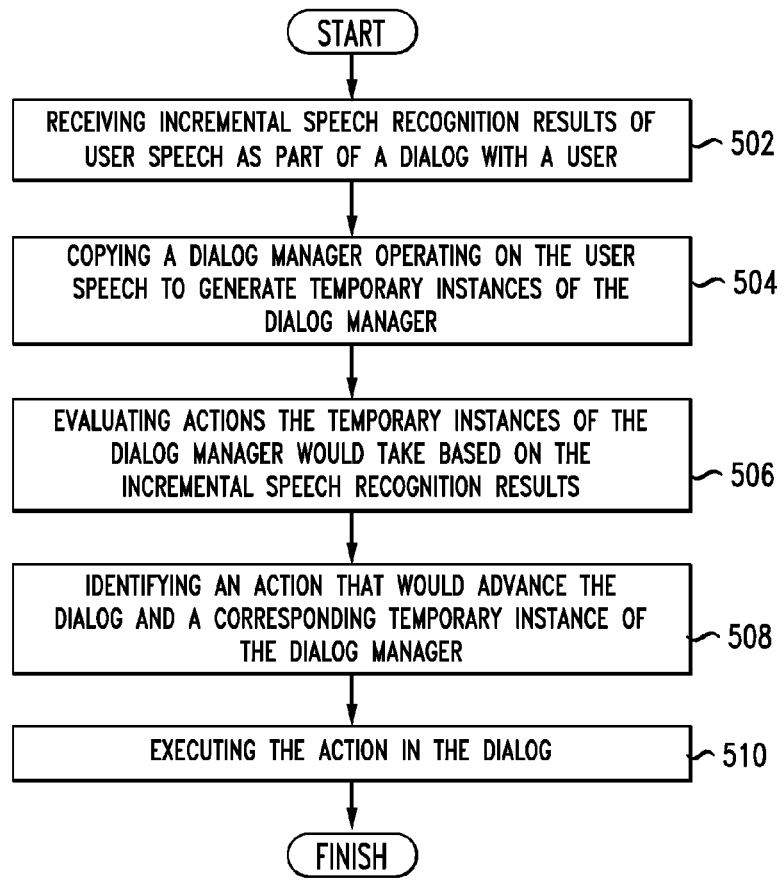

INCREMENTAL SPEECH RECOGNITION FOR DIALOG SYSTEMS

BACKGROUND

1. Technical Field

The present disclosure relates to dialog management and more specifically to incorporating incremental speech recognition output into a dialog management system.

2. Introduction

Speech can provide a natural human-machine interface. Speech interaction rely on turn-taking behavior. Appropriate turn-taking is difficult for spoken dialog systems. Some speech interface systems use a straightforward approach to turn-taking. The dialog system plays a prompt, and upon detecting any user speech, the dialog system switches off the prompt and waits to reply until the user stops speaking. This simplistic approach starts and stops the system prompt mechanically, without considering what the user is saying. Turn-taking errors are a common cause of failed interactions with spoken dialog systems.

Incremental speech recognition can enable the dialog system to reason about what the user has said while the user is still speaking. However, the partial speech recognition results are often unstable and highly inaccurate. Instability refers to the tendency of the partial recognition result to revise itself as more speech is decoded. For example, "traveling from" would be a revision of "traveling to". Inaccuracy refers to partial recognition that is sometimes semantically incomplete and may not reflect what the user intends to say. Conventional dialog management systems cannot handle revisions as the dialog state transitions following the system's reaction to the utterance, which leads to low recognition accuracy and improper turn-taking.

BRIEF DESCRIPTION OF THE DRAWINGS

FIG. 4 illustrates an example block diagram of integrating incremental speech recognition results with a partially observable Markov decision process (POMDP) dialog manager;

FIG. 5 illustrates a first example method embodiment; and

DETAILED DESCRIPTION

Figure 1:
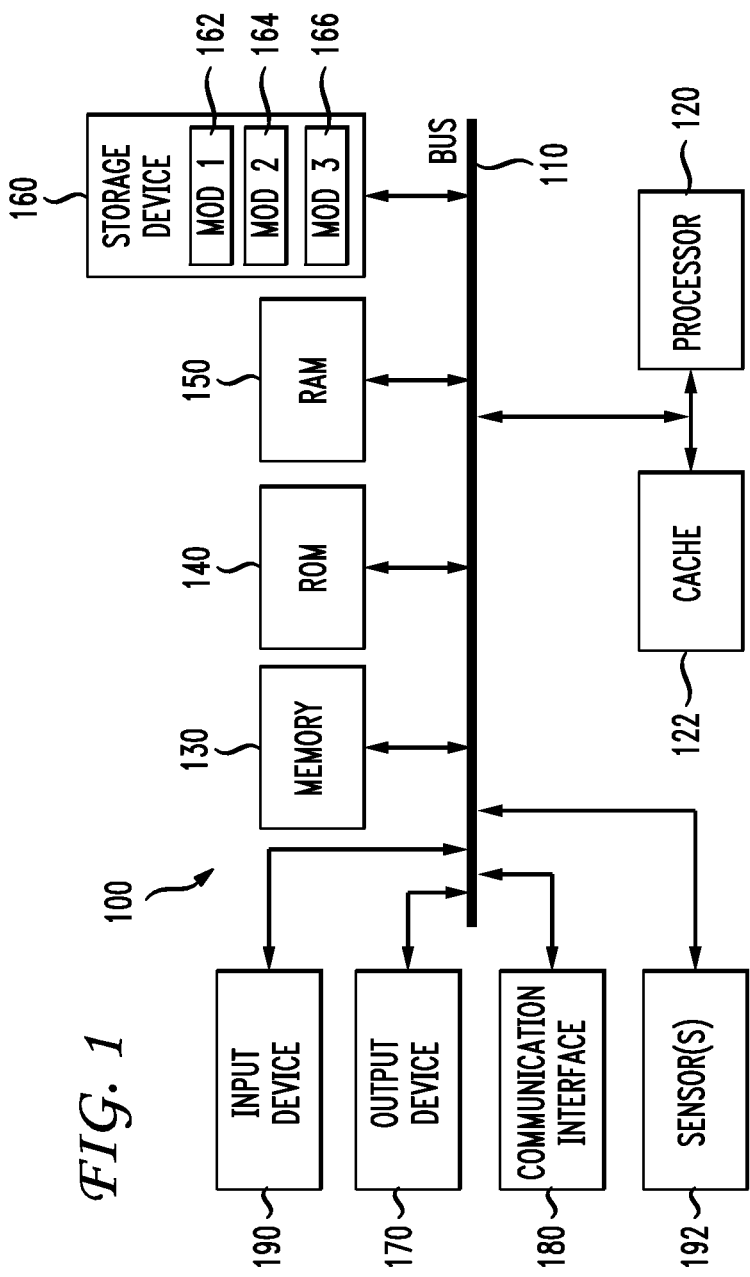
FIG. 1 illustrates an example system embodiment.

A system, method and non-transitory computer-readable media are disclosed that integrate incremental speech recognition results into turn-based spoken dialog. Incremental speech recognition refers to returning partial or complete recognition results while audio is still being decoded. Integrating incremental speech recognition can advance the turn-taking behavior of spoken dialog systems, where turn-taking refers to the system's decision of when to speak and when to be silent. When making turn-taking decisions, current systems only consider when the user is speaking Incremental speech recognition can enable spoken dialog systems to consider also what the user is saying.

Effective integration of incremental speech recognition with dialog management can be accomplished without restructuring and redesigning spoken dialog systems. Further, the semantic accuracy of partial results can be improved to achieve more successful spoken dialog interactions. The approaches set forth herein include new types of dialog managers known as Incremental Interaction or Dialog Managers or augmented dialog managers. Incremental or augmented dialog managers can provide the turn-taking benefits of incremental speech recognition while maintaining the simplicity of existing dialog system designs, and therefore avoiding the significant complexity of systems designed specifically to accept incremental input. Such dialog managers can handle revisions gracefully, especially when the dialog system has already started reacting to partial recognition result.

Incremental interaction or dialog managers (IIMs) can handle partial speech recognition inputs which may be unstable and change as additional speech is decoded. The IIM enables the addition of incremental input support to an existing conventional dialog manager, thus transforming the existing dialog manager in to an incremental interaction or dialog manager. Changes in partial speech recognition results are called revisions. Incremental interaction or dialog managers can enable the use of incremental speech recognition with any conventional turn-based dialog system. Thus, the majority of the turn-taking benefits of incremental speech recognition can be achieved without adjustments to existing dialog systems.

The incremental interaction or dialog manager (IIM) can manage communication between the recognizer, SLU components, and the dialog manager. In another embodiment, incremental speech recognition is integrated with a Partially Observable Markov Decision Process (POMDP) based dialog manager. A POMDP dialog manager keeps a probability distribution over user states and allows a number of current and past dialog and recognition features to be used when considering the meaning of a recognition result. Combining a POMDP dialog system with incremental speech recognition can substantially increase recognition accuracy. Incremental speech recognition integration can reduce customer care costs when spoken dialog systems are employed to handle all or part of customer service calls. Further, better turn-taking can yield faster interactions in which users are less likely to abandon automation, so potential cost savings can be coupled with an increase in customer satisfaction. Integrating incremental speech recognition with spoken dialog managers can enhance turn-taking for virtually any interactive spoken dialog system, such as a voice-activated remote control for a television, in-car applications such as driving directions, safer hands-free text message handling, and mobile voice search on mobile platforms.

The approaches set forth herein include integrating incremental speech recognition and SLU with conventional dialog systems and leveraging available dialog context to increase partial recognition accuracy. A POMDP based dialog manager is one example of a dialog manager that can leverage and incorporate context. The IIM speculatively advances the dialog manager to obtain a potential action for a partial result and can revert this advancement if the potential action is rejected. In one embodiment, the IIM creates a temporary copy (or a logical copy) of a currently active state of the dialog manager to which it provides a partial result and obtains a potential action. An actual copy copies all the bytes of the dialog manager state, whereas with a logical copy the system behaves as if a copy is made, but only actually copies those parts that cannot be shared between the original and the temporary copy. If the action does not meet the criteria, the IIM rejects the action and discards the temporary copy of the dialog manager. If the action meets the criteria, then the IIM executes the action.

An incremental result that triggers a new action may be revised. When a revision is received, the IIM can create a second copy of the original dialog manager and pass the new partial result to that second copy. If that second copy takes an action that advances the dialog and is different from the action generated by the first copy, then the IIM terminates the first action and discards the first copy of the dialog manager. Then the IIM starts the second action, and the second copy assumes the position held by the first copy. Any additional revisions to the incremental result can be handled by following the same procedure so that a current revision that advances the dialog and is different from the action of the previous revision replaces the previous version. Once recognition is complete, the IIM discards the original dialog manager and installs the copied dialog manager.

Many partial results can be discarded before passing them to the original or the copied instance of the dialog manager. In one embodiment, only incremental results that could correspond to complete user turns are considered. The IIM can discard incomplete results, which may never be passed to the dialog manager. In addition, acting on partial incremental speech recognition results which are unstable and likely to be revised can reduce efficiency of the dialog manager. As a way to increase efficiency, candidate results can be scored for stability, and the IIM can reject candidate results with low stability scores.

In another embodiment, incremental speech recognition is integrated with partially observable Markov decision process (POMDP) based dialog managers. A POMDP based dialog manager uses a probability distribution over multiple hidden dialog states called a belief state or a dialog state. A belief state may be more closely associated with a POMDP based dialog manager, whereas a dialog state is a more generic term. As such, a POMDP based dialog manager makes use of the entire N-Best list of recognition results, even for low-confidence results. The confidence level of each N-Best list item contributes proportionally to the probability of its corresponding hidden state. Each item on the N-Best list of an incremental result is assigned a confidence score and passed to the dialog manager, triggering a belief state update. A belief state generated from an incremental speech recognition result incorporates all or part of the contextual information available to the system from the beginning of the dialog. If the probability models in the POMDP are accurate, belief states reflecting this lengthier context are more accurate than incremental results in isolation.

One benefit of integrating incremental speech recognition with dialog systems is improved turn-taking decisions without restructuring the entire dialog management architecture. Further, partial recognition accuracy can be increased by using POMDP based dialog managers. Proper turn-taking is important functionality for multi-modal applications on mobile devices such as smartphones, GPS units, laptops, home automation systems, security systems, and tablet computing devices. For example, consider a driver speaking with a speech-enabled driving directions application running on a GPS device or smartphone. The dialog manager copes with constant but varied background noise, side conversations among passengers, and the driver pausing mid-utterance while speaking to focus on an important driving maneuver. Even with a push-to-talk interface, determining when the driver has started and finished speaking is crucial. Voice-enabled remote controls can encounter difficulty in busy family rooms, multi-modal search applications used in noisy public spaces, and other services. Numerous speech applications can benefit from graceful handling of turn-taking.

These and various additional embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts is disclosed herein. A more detailed description of the improved MAC will then follow. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
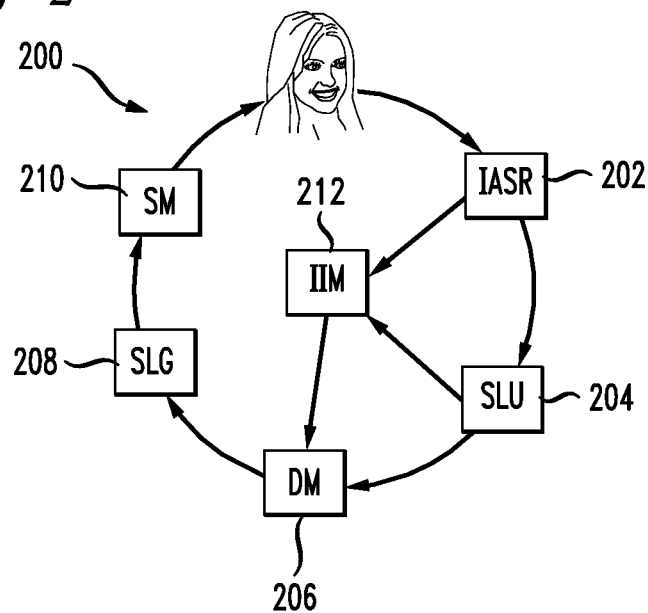
FIG. 2 illustrates a functional block diagram of an example natural language spoken dialog system.

FIG. 2 is a functional block diagram that illustrates an exemplary natural language spoken dialog system 200 incorporating an incremental interaction manager (IIM) 212. Spoken dialog systems aim to identify intents of humans, expressed in natural language, and take actions accordingly, to satisfy their requests. Natural language spoken dialog system 200 can include an incremental automatic speech recognition (IASR) module 202, a spoken language understanding (SLU) module 204, a dialog management (DM) module 206, a spoken language generation (SLG) module 208, synthesizing module 210, and IIM 212. The synthesizing module 210 can be any type of speech output module. For example, it can be a module wherein one prerecorded speech segment is selected and played to a user. Thus, the synthesizing module 210 represents any type of speech output. The present disclosure focuses on the IASR module 202, IIM 212, and DM 206, and can also relate to other components of the dialog system.

The IASR module 202 analyzes speech input and provides incremental speech recognition results, such as incremental textual transcriptions of the speech input as output. The IASR module 202 can generate the incremental textual transcriptions on a periodic basis, such as every 150 milliseconds, or when a threshold amount of additional speech has been received. SLU module 204 can receive the transcribed input and can use a natural language understanding model to analyze the group of words that are included in the transcribed input to derive a meaning from the input. The role of the DM module 206 is to interact in a natural way, including deciding whether and when to take a dialog turn, and help the user to achieve the task that the system 200 is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training IASR module 202 or any of the other modules in the spoken dialog system. Further, the modules of system 200 can operate independent of a full dialog system. For example, a computing device such as a smartphone (or any processing device having a phone capability) can include an IASR module wherein a user says "call mom" and the smartphone acts on the instruction without a "spoken dialog." IIM 212 can interact with any of the other modules of the system 200 at any point or at multiple points, such as the SLU 204 processing partial results from IASR 202 and providing results to IIM 212. Further, all or part of the functionality of IIM 212 as described herein can be incorporated in one or more other modules of the system 200. In one embodiment, IIM 212 is offered as a service, such as via a network or via the Internet, which is performed on a remote computer for the system. Thus, any network-enabled existing spoken dialog system can communicate with a network-based IIM service via an application programming interface (API) so that the spoken dialog system can rely on computing tasks which are executed elsewhere to process the incremental automatic speech recognition results efficiently.

Figure 3:
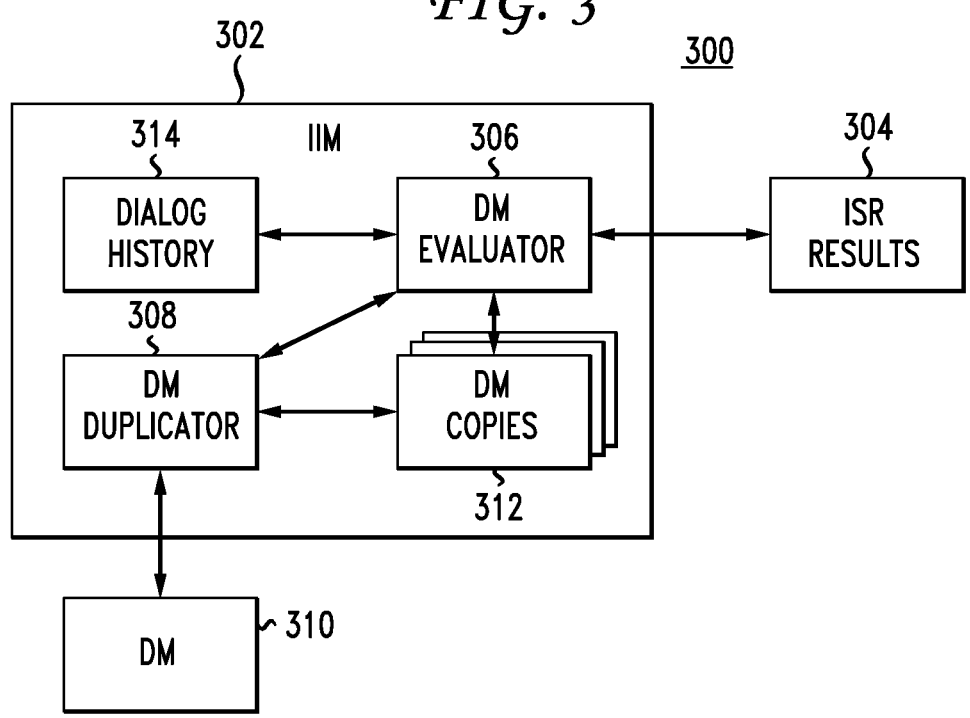
FIG. 3 illustrates a functional block diagram of an example incremental interaction manager.

FIG. 3 illustrates a functional block diagram 300 of an example IIM 302. IIM 302 mediates communication between IASR 202 and DM 310. IIM 302 evaluates potential dialog moves by applying IASR results to temporary instances 312 of the DM 310. IIM 302 copies the current state of the DM 310, provides the copied DM 312 with an incremental speech recognition result 304, and inspects the action that the copied DM would take. If the DM 310 design does not force a state transition following a result, then the DM 310 can supply the action without copying. The DM evaluator 306 determines whether the action advances the dialog. For example, if the action does not sufficiently advance the dialog, such as re-asking the same question, DM 306 rejects the action and discards the copied DM 312. If the action advances the dialog, such as asking for or providing new information, then DM 306 can implement or execute that action.

IIM 302 can gracefully handle revisions following a premature action execution, and a copying procedure is a viable solution for any DM 310. When a revision or incremental speech recognition result 304 is received, the DM duplicator 308 makes a second copy 312 of the original DM 310 and the new ISR result 304 is passed to that second copy. If that second copy 312 takes an action that advances the dialog and is different from the action generated by the first copy, then the first action is terminated, the first copy of the DM is discarded, the second action is initiated, and the second copy assumes the position of the first copy. Additional revisions can be handled by following the same procedure. Terminating a speech action and immediately starting another speech action can be jarring to a user. For example, if the system responds to a user saying "Boston" with the prompt "Ok Austin. Ok Boston," the user may feel that he or she is rudely interrupted. The jarring effect on users can be mitigated by preceding actions with either a sound or simple silence, at the expense of some response delay, resulting in the prompt "<sound> Ok Boston". Once recognition is complete, the copied DM 312 is installed as the new original DM 310 or as a replacement for the original DM 310.

As an optimization for efficiency, some ISR results 304 can be discarded before passing them to the DM 310. For example, only incremental results that could correspond to complete user utterance can be considered. Incomplete results can be discarded and never passed to the DM 310. In addition, ISR results 304 which are unstable, and thus undesirable because of the high likelihood of revision, can be discarded when the instability of the results exceeds a particular threshold. Thus each candidate ISR result 304 can be scored for stability so that IIM 302 discards results with scores below a threshold.

TABLE 1

| ISR | IIM | Original DM state | Copied DM state | DM action |
| --- | --- | --- | --- | --- |
| Prompt: "Where are you leaving from?" | | | | |
| Yew | Rej. P | 0 | 0 | — |
| Ridge | Acc. P/Rej. A | 0 | 0 | "I'm sorry . . . " |
| Mckee | Acc. P/Acc. A | 0 | 1 | "OK, Mckee . . . " |
| Mckeesport | Acc. P/Acc. A | 0 | 2 | "OK, Mckeesport..." |
| Mckeesport center | Acc. P/Rej. A | 0 | 2 | "OK, Mckeesport . . . " |
| Prompt: "OK, Mckeesport. Where are you going to?" | | | | |
| Pitt | Acc. P/Rej. A | 2 | 4 | "I'm sorry . . . " |
| Pittsburgh | Acc. P/Acc. A | 2 | 5 | "OK, Pittsburgh . . . " |

Table 1, above, shows example ISR results 304 from an incremental automatic speech recognizer, the IIM 302, and the DM 310. For the sake of clarity, stability scores are not shown. The system asks "Where are you leaving from?" and the user answers "Mckeesport Center." IIM 302 receives five incremental speech recognition results 304 (called partials), rejecting the first, yew, because its stability score (not shown) is too low. With the second, ridge, IIM 302 copies the DM 310, passes ridge to the copy 312, and discards the action of the copied DM 312, which is itself also discarded, because it does not advance the dialog. IIM 302 accepts and begins to execute the action generated by the third partial, mckee. The fourth partial revises the action, and the fifth action is rejected since it is the same. The original DM 310 is then discarded and the copied DM 312 state is put in its place. IIM 302 enables a turn-based DM to enjoy many of the benefits of incremental speech recognition, in particular, the ability to make turn-taking decisions with a complete account of the dialog history.

FIG. 4 illustrates an example block diagram 400 of integrating incremental speech recognition (ISR) results 402 with a partially observable Markov decision process (POMDP) dialog manager (DM) 408. POMDP DM 408 tracks a probability distribution over multiple hidden dialog states called a belief state. As such, POMDP DMs 408 readily make use of the entire ISR N-Best list 404 received from the ISR 402, even for low-confidence results. However, the confidence score 406 of each N-Best list item contributes proportionally to its probability of a corresponding hidden state. ISR 402 and POMDP DM 408 can be integrated using the IIM, shown in FIG. 3. Each item on the N-Best list 404 of an incremental speech recognition result is assigned a confidence score 406 and passed to the POMDP DM 408 as if it were a complete result, triggering a belief state update. This approach does not predict future user speech from partial results, but rather tentatively assumes that partial results are complete. From the ISR N-Best list 404 and the confidence scores 406, the POMDP DM 408 can determine a belief in a particular dialog state 410 or an action to take in response to a likely dialog state. One benefit of this approach is that a belief state generated from an incremental result that incorporates all of the contextual information available to the system from the start of the dialog until the moment of that incremental result. By comparison, an isolated incremental result includes only information from the current utterance. If the probability models in the POMDP are estimated properly, belief states should be more accurate than isolated incremental results.

FIG. 5 illustrates a first example method embodiment. This method embodiment is discussed in terms of an example system 100, as shown in FIG. 1, and its various modules configured to practice all or part of the method. The system 100 receives incremental speech recognition results of user speech as part of a dialog with a user (502). An incremental interaction manager (IIM) can receive the incremental speech recognition results, as set forth above. The incremental speech recognition results can be speech recognition results that are partial and represent a user utterance from a beginning point to an end point which is not the actual end of the user utterance. Thus, any recognized text from the incremental speech recognition result may be incomplete and may end in the middle of a thought, sentence, or even word. The system copies a dialog manager operating on the user speech to generate temporary instances of the dialog manager (504).

The system evaluates actions the temporary instances of the dialog manager would take based on the incremental speech recognition results (506). In one variation, the system starts up the temporary instances and processes the incremental speech recognition results using the temporary instances to determine their outputs. The temporary instances can execute in a scratch space, in a virtual machine, or some other location, possibly on one or more separate computing devices. The temporary instances can execute on the system that runs the dialog manager or on a separate device. As one way to increase efficiency of evaluating these actions, the system can discard temporary instances of the dialog manager that do not sufficiently advance the dialog. In another variation, the system discards incremental speech recognition results that do not correspond to a complete user utterance. Further, the system can receive a stability score for each incremental speech recognition result, and discard incremental speech recognition results having a corresponding stability score below a threshold. The system can increase efficiency by identifying temporary instances of the dialog manager that can be culled from consideration and removing them before significant resources are expended to analyze or process them. Thus, an initial round of testing using algorithms or approaches that require a smaller amount of CPU power or RAM may be used to decide which to discard and which to keep, then a more CPU intensive analysis or processing can be applied to the instances that remain.

The system identifies an action that would advance the dialog and a corresponding temporary instance of the dialog manager (508), and executes the action in the dialog (510). For example, executing the action can include making a turn-taking decision in the dialog, such as whether to speak or be silent. Instead of speaking, the system can alternatively decide whether to execute some other non-speech type of action, such as displaying a graphical prompt to the user. Executing the action can include determining what response to prepare in answer to the user's current utterance, and providing the spoken response to the user in the dialog. As part of the action or prior to executing the action, the system can optionally replace the dialog manager with the corresponding temporary instance of the dialog manager.

In a slightly different variation, the system receives an incremental speech recognition result of user speech as part of a dialog with a user, and copies a dialog manager operating on the user speech to generate a temporary dialog manager. The system evaluates an action of the temporary dialog manager based on the incremental speech recognition result. When the system determines that the action would advance the dialog and that the action is different than an existing action of the dialog manager, the system can execute the action in the dialog, and replace the dialog manager with the temporary dialog manager.

Figure 6:
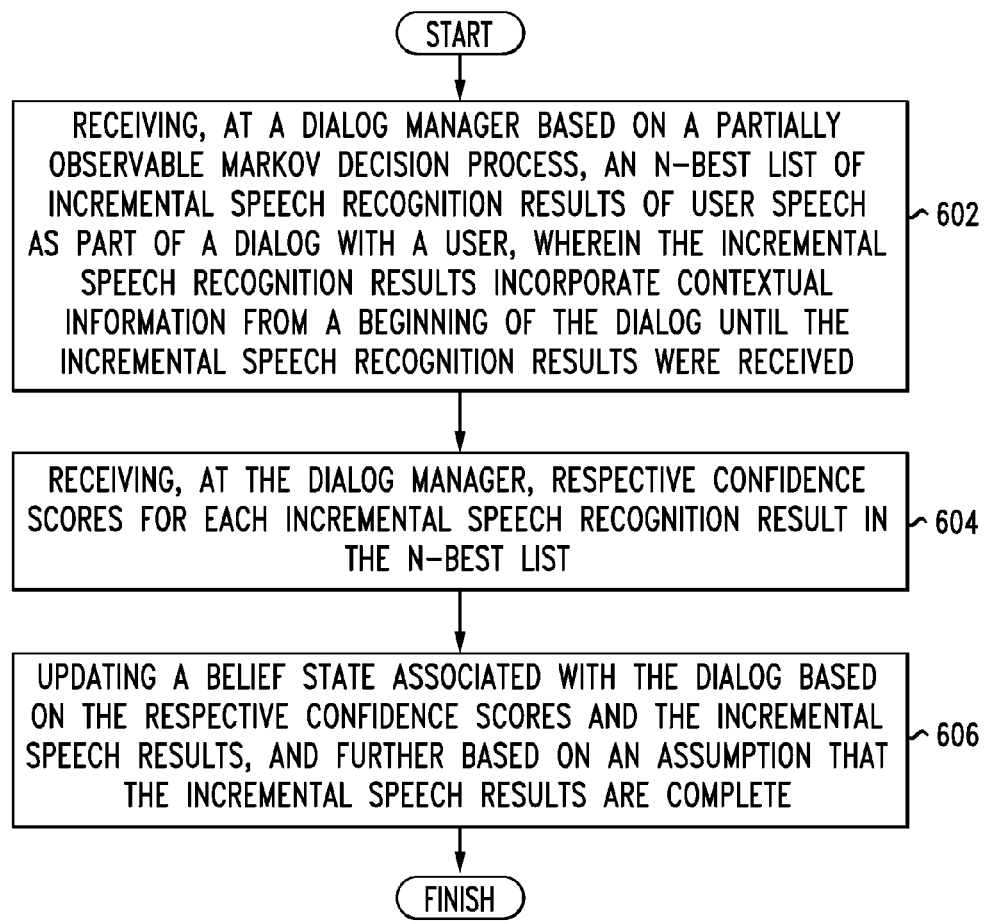
FIG. 6 illustrates a second example method embodiment.

FIG. 6 illustrates a second example method embodiment, which is also described in terms of an example system and any modules configured to practice the method. The system receives, at a dialog manager based on a partially observable Markov decision process, an N-best list of incremental speech recognition results of user speech as part of a dialog with a user, wherein the incremental speech recognition results incorporate contextual information from a beginning of the dialog until the incremental speech recognition results were received (602). The system also receives respective confidence scores for each incremental speech recognition result in the N-best list (604).

Then the system can update a belief state associated with the dialog based on the respective confidence scores and the incremental speech results, and further based on an assumption that the incremental speech results are complete (606). The system can also advance the dialog based on the belief state, such as by executing, in the dialog, an action associated with the belief state. The system can update the belief state by copying the dialog manager operating to generate temporary instances of the dialog manager, evaluating actions the temporary instances of the dialog manager would take based on the incremental speech recognition results, and updating the belief state based on the actions evaluated.

This approach integrates incremental speech recognition into a conventional dialog system and increase the accuracy of the partial results. The IIM operates by supporting the production of speculative dialog actions by the dialog manager. The combination of incremental speech recognition with POMDPs, facilitated by the IIM, can increase the accuracy of partial results by leveraging additional available contextual information, up to and including all available contextual information.

While the examples provided herein primarily discuss speech processing, these principles can be applied to one or more other input modalities with any respective modifications to accommodate processing of the other input modalities. For example, the system can receive an N-best list of recognition results for gesture input, touchscreen input, pen or electronic ink input, and so forth. The dialog manager can manage speech, non-speech, or mixed-modality 'dialogs' with one or more users by boosting the recognition accuracy of a dialog turn using the entire dialog context.

Embodiments within the scope of the present disclosure may also include tangible and/or non-transitory computer-readable storage media for carrying or having computer-executable instructions or data structures stored thereon. Tangible computer-readable media can exclude transitory signals. Such non-transitory computer-readable storage media can be any available media that can be accessed by a general purpose or special purpose computer, including the functional design of any special purpose processor as described above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to any speech application which involves a dialog manager. Various modifications and changes that may be made to the principles described herein without following the example embodiments and applications illustrated and described herein, and without departing from the spirit and scope of the disclosure.

We claim:

1. A method comprising:
    receiving incremental speech recognition results of user speech as part of a dialog with a user;
    copying a dialog manager operating on the user speech to generate a temporary instance of the dialog manager;
    evaluating, via a processing device, an action the temporary instance of the dialog manager would take based on the incremental speech recognition results;
    determining that the action that would advance the dialog; and
    executing the action in the dialog.

2. The method of claim 1, further comprising:
    replacing the dialog manager with the temporary instance of the dialog manager.

3. The method of claim 1, wherein executing the action in the dialog comprises making a turn-taking decision in the dialog.

4. The method of claim 3, wherein the turn-making decision comprises deciding when to speak or when to be silent.

5. The method of claim 1, wherein executing the action further comprises providing a spoken response in the dialog.

6. The method of claim 1, further comprising:
    discarding the temporary instance of the dialog manager when the action would not sufficiently advance the dialog.

7. The method of claim 1, further comprising:
    deleting the dialog manager; and
    substituting the dialog manager with the temporary instance of the dialog manager.

8. The method of claim 1, further comprising:
    discarding incremental speech recognition results that do not correspond to a complete user utterance.

9. The method of claim 1, further comprising:
    receiving a stability score for each incremental speech recognition result; and
    discarding incremental speech recognition results having a corresponding stability score below a threshold.

10. The method of claim 1, wherein an incremental interaction manager receives the incremental speech recognition results.

11. A system comprising:
    a processor; and
    a computer-readable storage medium having instructions stored which, when executed by the processor, cause the processor to perform operations comprising:
        receiving incremental speech recognition results of user speech as part of a dialog with a user;
        copying a dialog manager operating on the user speech to generate a temporary instance of the dialog manager;
        evaluating an action the temporary instance of the dialog manager would take based on the incremental speech recognition results;
        determining that the action that would advance the dialog; and
        executing the action in the dialog.

12. The system of claim 11, the computer-readable storage medium having additional instructions, when executed by the processor, result in operations comprising:
    advance the dialog based on the dialog state.

13. The system of claim 12, wherein advancing the dialog further comprises:
    executing, in the dialog, an action associated with the dialog state.

14. The system of claim 11, wherein updating the dialog state further comprises:
    copying the dialog manager operating to generate temporary instances of the dialog manager;
    evaluating actions the temporary instances of the dialog manager would take based on the incremental speech recognition results; and
    updating the dialog state based on the actions evaluated.

15. A computer-readable storage device having instructions stored which, when executed by a computing device, cause the computing device to perform operations comprising:
    receiving incremental speech recognition results of user speech as part of a dialog with a user;
    copying a dialog manager operating on the user speech to generate a temporary instance of the dialog manager;
    evaluating, via a processing device, an action the temporary instance of the dialog manager would take based on the incremental speech recognition results;
    determining that the action that would advance the dialog; and
    executing the action in the dialog.

16. The computer-readable storage device of claim 15, wherein executing the action in the dialog comprises making a turn-taking decision in the dialog.

17. The computer-readable storage device of claim 16, wherein the turn-making decision comprises deciding when to speak or when to be silent.

18. The computer-readable storage device of claim 15, wherein executing the action further comprises providing a spoken response in the dialog.

19. The computer-readable storage medium of claim 15, wherein the instructions, when executed by the computing device, cause the computing device to perform a method further comprising:

discarding temporary instances of the dialog manager which do not sufficiently advance the dialog.

20. The computer-readable storage device of claim 15, having additional instructions stored which, when executed by the computing device, cause the computing device to perform operations comprising:
discarding incremental speech recognition results that do not correspond to a complete user utterance.

\* \* \* \* \*